United States Patent
Marchioro Rech et al.

(10) Patent No.: US 12,528,505 B2
(45) Date of Patent: Jan. 20, 2026

(54) SYSTEMS AND METHODS FOR RESPONDING TO DETECTED EMERGENCY VEHICLES

(71) Applicant: GM CRUISE HOLDINGS LLC, San Francisco, CA (US)

(72) Inventors: Lucio Otavio Marchioro Rech, San Mateo, CA (US); Eric Michael Lujan, San Francisco, CA (US); Yang Tian, San Mateo, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 90 days.

(21) Appl. No.: 17/724,003

(22) Filed: Apr. 19, 2022

(65) Prior Publication Data
US 2023/0331253 A1  Oct. 19, 2023

(51) Int. Cl.
*B60W 60/00* (2020.01)
*B60W 50/00* (2006.01)

(52) U.S. Cl.
CPC .... *B60W 60/0015* (2020.02); *B60W 50/0098* (2013.01); *B60W 60/007* (2020.02); *B60W 2050/0028* (2013.01); *B60W 2554/402* (2020.02); *B60W 2556/45* (2020.02)

(58) Field of Classification Search
CPC ......... B60W 60/0015; B60W 50/0098; B60W 60/007; B60W 2050/0028; B60W 2554/402; B60W 2556/45; B60W 2420/42; B60W 2420/54; B60W 2554/404; B60W 2556/50; B60W 60/001; G05D 1/021
See application file for complete search history.

(56) References Cited

U.S. PATENT DOCUMENTS

| | | | | |
|---|---|---|---|---|
| 6,611,737 B1 * | 8/2003 | El-Tahan | ............. | G05D 1/0206 701/472 |
| 9,055,425 B2 * | 6/2015 | Luukkala | ................ | H04W 4/90 |
| 9,523,984 B1 * | 12/2016 | Herbach | ............... | B60W 10/18 |
| 10,074,274 B2 * | 9/2018 | Becker | .................. | H04W 84/18 |

(Continued)

FOREIGN PATENT DOCUMENTS

| | | | | |
|---|---|---|---|---|
| DE | 102018118760 A1 * | 2/2020 | | |
| EP | 3665056 A1 * | 6/2020 | ............ | B60W 30/00 |
| EP | 2901233 B1 * | 1/2021 | .............. | F24F 11/30 |

OTHER PUBLICATIONS

"Ebizuka, Yuki; Kato, Shin; Itami, Makoto; Detecting approach of emergency vehicles using siren sound processing; Oct. 2019; 2019 IEEE Intelligent Transportation Systems Conference" (Year: 2019).*

*Primary Examiner* — Ramya P Burgess
*Assistant Examiner* — Christopher R Cardimino
(74) *Attorney, Agent, or Firm* — CANTOR COLBURN LLP

(57) ABSTRACT

Disclosed are systems and methods for responding to detected emergency vehicles. In some aspects, a method includes generating an emergency vehicle (EMV) detection signal based on sensor signals of an autonomous vehicle (AV); determining, based on the EMV detection signal, whether remote assistance (RA) is invoked for the EMV signal or whether the AV is to handle the EMV detection signal autonomously; and responsive to determining that the AV is to handle the EMV detection signal autonomously, determining a trajectory of the AV in response to the EMV detection signal.

17 Claims, 8 Drawing Sheets

(56) References Cited

U.S. PATENT DOCUMENTS

| | | | |
|---|---|---|---|
| 10,127,818 B2* | 11/2018 | Mandeville-Clarke | B62D 15/0255 |
| 10,293,810 B2* | 5/2019 | Wang | B60W 30/18063 |
| 10,896,606 B1* | 1/2021 | Hayes | G05D 1/0022 |
| 11,295,757 B2* | 4/2022 | Buddhadev | G01S 3/8006 |
| 11,450,205 B2* | 9/2022 | Tariq | G08G 1/0112 |
| 11,460,861 B2* | 10/2022 | Fox | G05D 1/024 |
| 11,548,518 B2* | 1/2023 | Omari | B60W 50/0098 |
| 2019/0039613 A1* | 2/2019 | Lee | G08G 1/167 |
| 2020/0307563 A1* | 10/2020 | Ghafarianzadeh | G06V 40/25 |
| 2022/0219736 A1* | 7/2022 | Xu | B60W 30/18163 |
| 2023/0078779 A1* | 3/2023 | Eng | B60W 30/0956 701/117 |
| 2023/0089978 A1* | 3/2023 | Pulver | G05D 1/0238 701/26 |
| 2023/0245564 A1* | 8/2023 | James | G08G 1/0116 701/117 |

\* cited by examiner

500

Receive indication to autonomously handle an active emergency vehicle (EMV) detected by autonomous vehicle (AV)
510

Identify requirements of behaviors of the AV in responding to the EMV including stopping region, inclusion regions, exclusion regions, urgency, and behavioral flags
520

Encode the identified requirements in a representation of a response of the AV to the EMV
530

Pass the encoded representation to a trajectory generation system to generate a trajectory of the AV in view of the representation
540

Receive an emergency vehicle (EMV) detection signal based on sensor signals of the autonomous vehicle (AV)
610

↓

Determine, based on the EMV detection signal, whether remote assistance (RA) is invoked for the EMV signal or whether the AV is to handle the EMV detection signal autonomously
620

↓

Responsive to determining that the AV is to handle the EMV detection signal autonomously, generate an encoded representation of a response of the AV to the EMV detection signal
630

↓

Determine, based on the encoded representation of the response, a trajectory of the AV in response to the EMV detection signal
640

Receive an EMV detection signal based on sensor signals of the autonomous vehicle (AV)
710

Determine, based on the EMV detection signal, whether remote assistance (RA) is invoked for the EMV signal or whether the AV is to handle the EMV detection signal autonomously
720

Responsive to determining that the RA is invoked for the EMV signal, send an EMV RA request to the RA
730

Receive, in response to the EMV RA request, feedback from the RA providing guidance with respect to the EMV detection signal
740

Determine, based on the feedback from the RA, a trajectory of the AV in response to the EMV signal
750

FIG. 7

SYSTEMS AND METHODS FOR RESPONDING TO DETECTED EMERGENCY VEHICLES

TECHNICAL FIELD

Embodiments described herein generally relate to the field of autonomous vehicles, and more particularly relate to systems and methods for responding to detected emergency vehicles.

BACKGROUND

Autonomous vehicles, also known as self-driving cars, driverless vehicles, and robotic vehicles, may be vehicles that use multiple sensors to sense the environment and move without human input. Automation technology in the autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) for facilitating driving safety. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

FIG. 5 illustrates an example method for generating an encoded representation for a response to an active EMV by an autonomous vehicle.

FIG. 6 illustrates an example method for autonomous handling of a response to a detected EMV signal by an autonomous vehicle.

FIG. 7 illustrates an example method for remote assistance (RA) handling of a response to a detected EMV signal for an autonomous vehicle.

DETAILED DESCRIPTION

Figure 1:
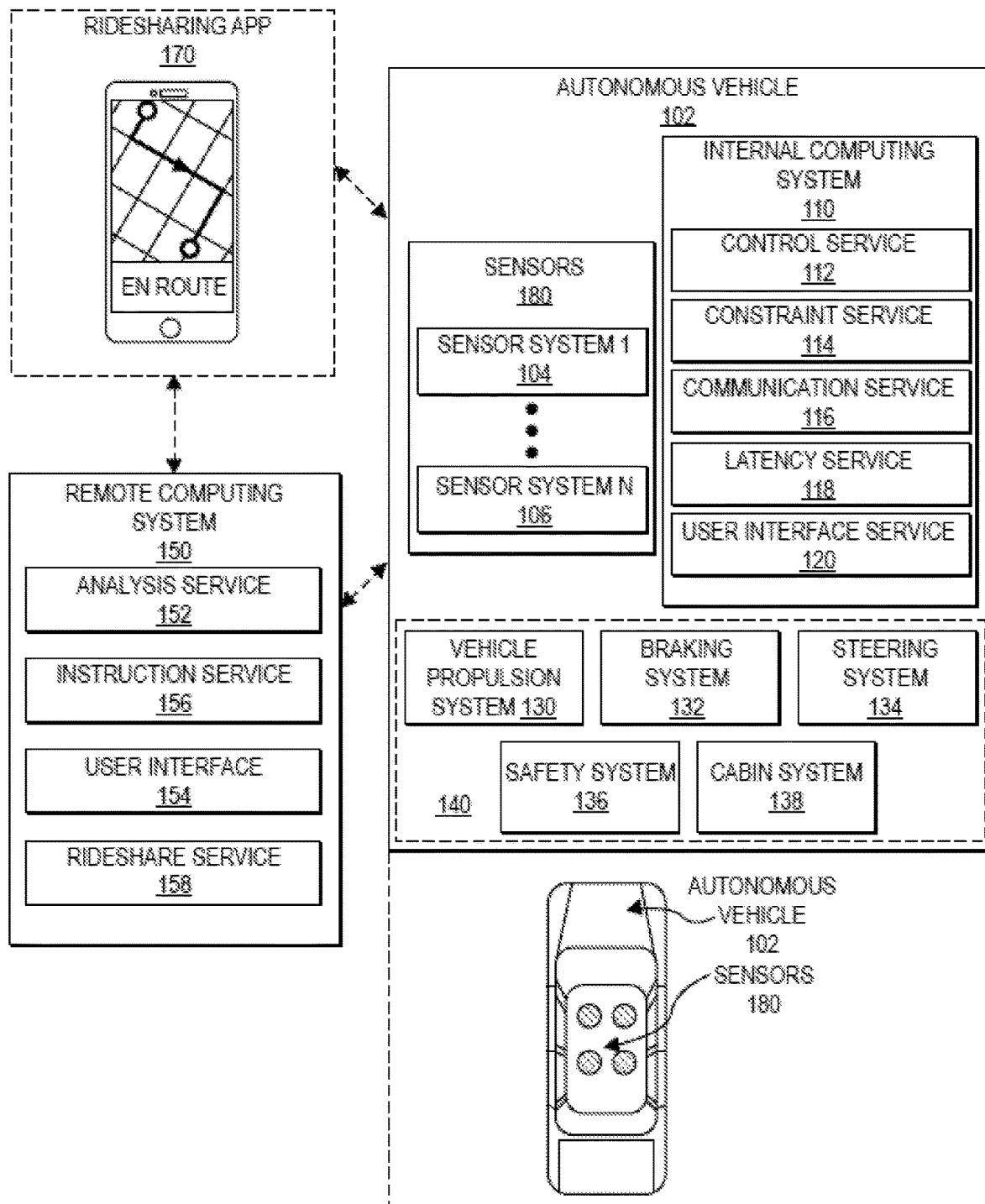
FIG. 1 illustrates an autonomous vehicle and remote computing system architecture in accordance with one embodiment.

Autonomous vehicles (AVs) can be implemented by companies to provide self-driving car services for the public, such as taxi or ride-hailing (e.g., ride-sharing) services. In the course of operation, AVs may encounter emergency vehicles (EMVs) on the road. An EMV may refer to any type of vehicle that can actively respond to emergency situations while driving on roads. In some cases, the EMV(s) may be in the process of actively responding to emergencies. When an EMV is active and responding to an emergency, time is usually of the essence as lives and/or public safety may be at risk. As such, non-EMV traffic, including autonomous vehicle traffic, is required to respond in special ways when interacting with EMVs, such as yielding right of way to the EMVs. Furthermore, customers utilizing the autonomous vehicles may have specific expectations for how the autonomous vehicles should properly respond to EMVs in the active EMV situations when a ride is in progress.

Vehicle systems, apparatuses, and methods for responding to detected EMVs are described. In one example embodiment, an EMV detection signal can be received, where the EMV detection signal is generated based on sensor signals (e.g., audio signals, video signals, etc.) of the autonomous vehicle. Based on the EMV detection signal, it is determined whether remote assistance (RA) should be invoked for the EMV signal or whether the AV should handle the EMV detection signal response autonomously. In response to determining that the AV is to handle the EMV detection signal autonomously, an encoded representation of a response of the AV to the EMV detection signal is generated. A trajectory of the AV in response to the EMV signal can then be generated based on the encoded representation of the response. Further details of the systems and methods for responding to detected EMVs are provided below with respect to FIGS. 1-8.

In the following description, for purposes of explanation, numerous specific details are set forth in order to provide a thorough understanding of the embodiments herein. It will be apparent, however, to one skilled in the art that the embodiments herein can be practiced without these specific details. In other instances, well-known structures and devices are shown in block diagram form in order to avoid obscuring the embodiments herein.

Reference in the specification to "one embodiment" or "an embodiment" means that a particular feature, structure or characteristic described in connection with the embodiment is included in at least one embodiment herein. Thus, the appearances of the phrase "in one embodiment" appearing in various places throughout the specification are not necessarily all referring to the same embodiment. Likewise, the appearances of the phrase "in another embodiment," or "in an alternate embodiment" appearing in various places throughout the specification are not all necessarily all referring to the same embodiment.

The following glossary of terminology and acronyms serves to assist the reader by providing a simplified quick-reference definition. A person of ordinary skill in the art may understand the terms as used herein according to general usage and definitions that appear in widely available standards and reference books.

FIG. 1 illustrates an autonomous vehicle and remote computing system architecture in accordance with one embodiment. The autonomous vehicle 102 can navigate about roadways without a human driver based upon sensor signals output by sensor systems 180 of the autonomous vehicle 102. The autonomous vehicle 102 includes a plurality of sensor systems 180 (e.g., a first sensor system 104 through an Nth sensor system 106). The sensor systems 180 are of different types and are arranged about the autonomous vehicle 102. For example, the first sensor system 104 may be a camera sensor system and the Nth sensor system 106 may be a Light Detection and Ranging (LIDAR) sensor system to perform ranging measurements for localization. Other example sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it should be understood that more or fewer sensors may be coupled to the autonomous vehicle 102.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. In some cases, the braking system 132 may charge a battery of the vehicle through regenerative braking. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 180 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 180 and human co-pilots, etc.

The internal computing system 110 can include a control service 112 that is configured to control operation of a mechanical system 140, which includes vehicle propulsion system 130, the braking system 132, the steering system 134, the safety system 136, and the cabin system 138. The control service 112 receives sensor signals from the sensor systems 180 and communicates with other services of the internal computing system 110 to effectuate operation of the autonomous vehicle 102. In some embodiments, control service 112 may carry out operations in concert with one or more other systems of autonomous vehicle 102. The control service 112 can control driving operations of the autonomous vehicle 102 based on sensor signals from the sensor systems 180. In one example, the control service receives sensor signals to monitor driving operations and to determine localization of the vehicle. The control service determines lateral force disturbances for front and rear lateral accelerations and a bulk longitudinal force disturbance for the vehicle based on the localization and the sensor signals. The control service determines a tire road limit nearness estimation for the vehicle based on the sensor signals, the lateral force disturbances for front and rear lateral accelerations and a bulk longitudinal force disturbance.

The internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 4G, 5G, etc.) communication.

In some embodiments, one or more services of the internal computing system 110 are configured to send and receive communications to remote computing system 150 for such reasons as reporting data for training and evaluating machine learning algorithms, requesting assistance from the remote computing system or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make decisions or to provide the feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102 such as performing object detection for methods and systems disclosed herein. The analysis service 152 can also perform analysis pertaining to data associated with one or more errors or constraints reported by autonomous vehicle 102. In another example, the analysis service 152 is located within the internal computing system 110.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle 102 to go around an obstacle, change routes, honk the horn, etc.

The rideshare service 158 as depicted in FIG. 1 illustrates a vehicle 102 as a triangle enroute from a start point of a trip to an end point of a trip, both of which are illustrated as circular endpoints of a thick line representing a route traveled by the vehicle. The route may be the path of the vehicle from picking up the passenger to dropping off the passenger (or another passenger in the vehicle), or it may be the path of the vehicle from its current location to picking up another passenger.

Figure 2:
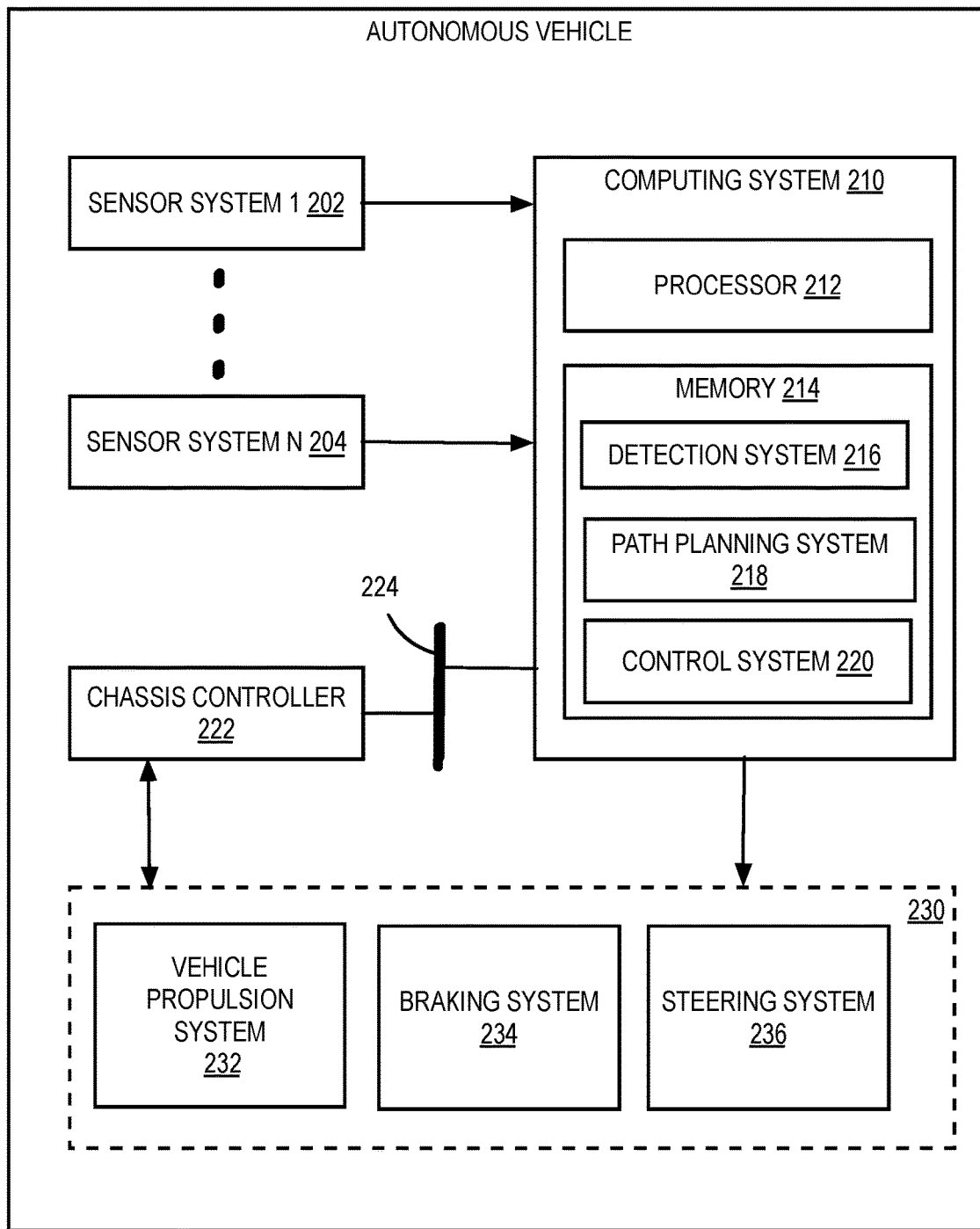
FIG. 2 illustrates an example autonomous vehicle in accordance with one embodiment.

FIG. 2 illustrates an example autonomous vehicle 200 in accordance with one embodiment. In one embodiment, autonomous vehicle 200 is the same as autonomous vehicle 102 described with respect to FIG. 1. The autonomous vehicle 200 can navigate about roadways without a human driver based upon sensor signals output by sensor systems 202-204 of the autonomous vehicle 200. The autonomous vehicle 200 includes a plurality of sensor systems 202-204 (a first sensor system 202 through an Nth sensor system 204). The sensor systems 202-204 are of different types and are arranged about the autonomous vehicle 200. For example, the first sensor system 202 may be a camera sensor system and the Nth sensor system 204 may be a lidar sensor system. Other example sensor systems include, but are not limited to, radar sensor systems, global positioning system (GPS) sensor systems, inertial measurement units (IMU), infrared sensor systems, laser sensor systems, sonar sensor systems, and the like. Furthermore, some or all of the of sensor systems 202-204 may be articulating sensors that can be oriented/rotated such that a field of view of the articulating sensors is directed towards different regions surrounding the autonomous vehicle 200.

The autonomous vehicle 200 further includes several mechanical systems that can be used to effectuate appropriate motion of the autonomous vehicle 200. For instance, the mechanical systems 230 can include but are not limited to, a vehicle propulsion system 232, a braking system 234, and a steering system 236. The vehicle propulsion system 232 may include an electric motor, an internal combustion engine, or both. The braking system 234 can include an engine break, brake pads, actuators, and/or any other suitable componentry that is configured to assist in decelerating the autonomous vehicle 200. The steering system 236 includes suitable componentry that is configured to control the direction of movement of the autonomous vehicle 200 during propulsion.

The autonomous vehicle 200 additionally includes a chassis controller 222 that is activated to manipulate the mechanical systems 230 when an activation threshold of the chassis controller 222 is reached.

The autonomous vehicle 200 further comprises a computing system 210 that is in communication with the sensor systems 202-204, the mechanical systems 230, and the chassis controller 222. While the chassis controller 222 is activated independently from operations of the computing system 210, the chassis controller 222 may be configured to communicate with the computing system 210, for example, via a controller area network (CAN) bus 224. The computing system 210 includes a processor 212 and memory 214 that stores instructions which are executed by the processor 212 to cause the processor 212 to perform acts in accordance with the instructions.

The memory 214 comprises a detection system 216, a path planning system 218, and a control system 220. The detection system 216 identifies objects in the vicinity (e.g., scene context) of the autonomous vehicle 200. The detection system 216 may analyze sensor signals generated by the sensor system 202-204 to identify the objects. Detection system 216 may also identify characteristics of the detected objects, such as distance, velocity, direction, and so on. In some embodiments, the detection system 216 implements one or more trained machine learning (ML) models for the object identification.

The path planning system 218 generates a path plan for the autonomous vehicle 200, wherein the path plan can be identified both spatially and temporally according to one or more impending timesteps. The path plan can include one or more maneuvers to be performed by the autonomous vehicle 200. In one embodiment, the path planning system 218 can respond to detected EMVs in accordance with the techniques discussed herein.

The control system 220 is configured to control the mechanical systems of the autonomous vehicle 200 (e.g., the vehicle propulsion system 232, the braking system 234, and the steering system 236 based upon an output from the sensor systems 202-204 and/or the path planning system 218. For instance, the mechanical systems can be controlled by the control system 220 to execute the path plan determined by the path planning system 218. Additionally or alternatively, the control system 220 may control the mechanical systems 232-236 to navigate the autonomous vehicle 200 in accordance with outputs received from the sensor systems 202-204.

Figure 3:
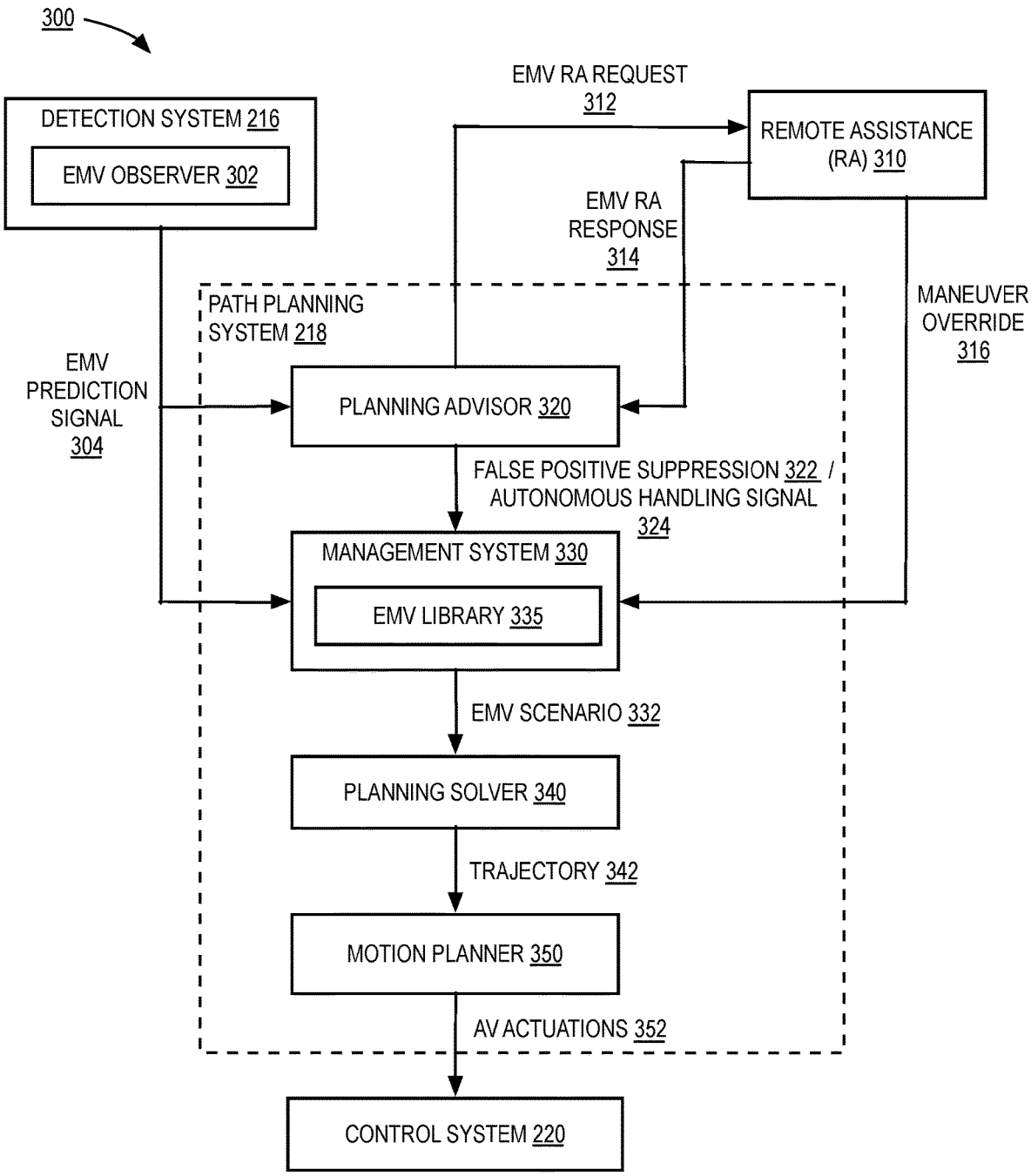
FIG. 3 illustrates an example emergency vehicle (EMV) response system, in accordance with embodiments herein.

FIG. 3 illustrates an example EMV response system 300 in accordance with embodiments herein. In one embodiment, the EMV response system 300 is implemented by an autonomous vehicle, such as autonomous vehicle 200 described with respect to FIG. 2. For example, EMV response system 300 may be implemented by a computing system, such as computing system 210 of autonomous vehicle 200 of FIG. 2, and include the detection system 216, path planning system 218, and control system 220 described with respect to FIG. 2.

EMV response system 300 may also include a remote assistance (RA) 310 component that is communicably coupled to the path planning system 218 (may also be referred to herein as planning system). Although not specifically illustrated, RA 310 may be communicably coupled to the detection system 216 in some embodiments. In one embodiment, a network may be used to communicably couple the RA 310 with the components of the autonomous vehicle, such as to path planning system 218 and/or detection system 216. In one embodiment, RA 310 may be hosted by the remote computing system 150 described with respect to FIG. 1, and may include the analysis service 152 and the instruction service 156 of FIG. 1.

For purposes of the description herein, an EMV may refer to any type of vehicle that can actively respond to emergency situations while driving on roads. This can include the following types of vehicles: police cars, police motorcycles, fire trucks, and ambulances. Other types of vehicles that may be accorded special treatment on the roads, but are not considered EMVs, may include tow trucks or school buses. However, in some embodiments, these vehicles, as well as others not specifically delineated above, may be considered EMVs. EMVs may be exempt from following certain vehicle codes, rules, or regulations when responding to emergencies. As such, while responding to emergencies, other traffic, including autonomous vehicles, are required to respond to EMVs in special ways (e.g., yielding right of way) when encountering them.

In some implementations, EMVs can be considered to be in one of two states at a given time: active or inactive. An active EMV may be any considered any authorized EMV that drives with a lighted (e.g., red) lamp and/or audible siren as a result of attending to an emergency. For example, fire trucks heading to the scene of a fire, ambulances heading to the scene of injuries or carrying an injured person to a hospital, police cars heading to the scene of a crime or pursuing entities suspected of violating the law, etc. may be considered in an active state. In some embodiments, an active EMV may or may not have their siren audible while active. Examples of active EMVs that may not have a siren audible can include fire trucks with lights on (but no siren audible) at the scene of an emergency, ambulances driving late at night with lights flashing but no audible siren, etc. In these cases, other drivers, including riders of the AV, still understand that the EMV is responding to an emergency due to the EMV's visible flashing lights, even if they do not have an audible siren.

An inactive EMV may refer to an EMV that does not have any light and/or siren flashing and is therefore not currently in the process of actively responding to any emergency. Examples of inactive EMVs may include police cars on patrol, fire trucks heading back to their stations, ambulances driving back to dispatch after dropping off their passengers at a hospital, and so on.

In embodiments herein, EMV response system 300 can respond to an "active" EMV that is detected by the EMV response system 300. Detection system 216 may receive one or more sensor signals, such as audio signals, video signals, other sensor signals (e.g., RADAR, LIDAR, etc.), and so on, from one or more sensor systems of the autonomous vehicle. The detection system 216 may include an EMV observer 302 that is configured to detect an active EMV object in the vicinity of the autonomous vehicle based on the one or more received sensor signals.

The EMV observer 302 may include one or more trained machine learning models that are trained to detect an EMV from the sensor signals. In one embodiment, the EMV observer 302 can differentiate between an active EMV and an inactive EMV, and generates an EMV prediction signal 304 (may also be referred to herein as EMV detection signal) when an active EMV is detected. The EMV prediction signal 304 may be generated when one or more active EMVs become initially discernable near the autonomous vehicle. "Discernible" may refer to (1) the EMV's flashing (red and/or blue) lights become visible from the AV's position, or (2) the EMV's siren (if sounded) can be heard from the AV's position prior to the EMV's flashing lights becoming visible (e.g., above a threshold decibel level), for example. Other factors may also contribute to discernibility and embodiments are not limited to those described above.

An EMV interaction with the autonomous vehicle may begin when the EMV is first "discernible" (e.g., either visually or audibly). The EMV interaction with the autonomous vehicle may end when one of the following becomes true: (1) all active EMVs in the scene have passed and/or are moving away from the autonomous vehicle's current position, or (2) all EMVs in the scene have turned off their flashing lights and sirens (thus becoming "inactive").

In one embodiment, the EMV observer 302 may send the EMV prediction signal 304 to the path planning system 218 to initiate an EMV interaction at the autonomous vehicle. In some embodiments, the EMV prediction signal 304 may include a probability value (e.g., 0%-100%) that a detected object is an EMV. In some embodiments, the EMV prediction signal 304 may also include additional information regarding contextual elements of the detected EMV object. This additional information may include whether the detected EMV object (referred to as EMV) is currently visible and/or audible to the autonomous vehicle, position and movement of the detected EMV object relative to the autonomous vehicle, whether the EMV is moving towards or away from the autonomous vehicle, whether the EMV is approaching the autonomous vehicle from the front, the rear, left/right (e.g., angle of approach), whether the EMV is in the same lane or a lane left or right of the autonomous vehicle, whether the EMV and autonomous vehicle are currently driving on opposite sides of a divided road from each other, and/or how much lateral road clearance is possible to provide on the current road when stopping, to name a few examples. In some embodiments herein, the additional information above may include other characteristics not specifically called out and can dynamically change during operation of the autonomous vehicle.

In one embodiment, the path planning system 218 receives the EMV prediction signal 304 and generates a response to the EMV prediction signal 304. As illustrated, in one embodiment, the path planning system 218 may include a planning advisor 320, a management system 330, a planning solver 340, and a motion planner 350. In embodiments herein, the planning advisor 320, the management system 330, the planning solver 340, and/or the motion planner 350, as well as their sub-components, may be implemented by hardware, software, firmware and/or any combination of hardware, software and/or firmware of a computing system.

The planning advisor 320 may analyze the EMV prediction signal 304 to determine a response mode to the detected EMV object. The response mode may include ignoring the EMV prediction signal 304, requesting assistance with the EMV prediction signal 304 from RA 310, and/or autonomously handling the EMV prediction signal 304 at the autonomous vehicle.

In one embodiment, the EMV prediction signal 304 is compared to a set of EMV detection threshold values to determine the response mode. For example, if the EMV prediction signal 304 is below a first EMV prediction threshold (e.g., low probability that detected object is an active EMV), the planning advisor 320 may send a false positive suppression signal 322 to the management system 330. If the EMV prediction signal 304 satisfies the first EMV prediction threshold but is below a second EMV prediction threshold (e.g., medium probability that detected object is an active EMV; there is some uncertainty as to whether the detected object is an EMV), then the planning advisor 320 may request RA 310 assistance by generating an EMV RA request 312 to transmit to the RA 310. If the EMV prediction signal 304 satisfies both the first EMV prediction threshold and the second EMV prediction threshold (e.g., high probability (confidence) that the detected object is an active EMV), then the planning advisor 320 may send an autonomous handling signal 324 to the management system 330. In embodiments herein, the set of EMV detection threshold values may be tuned according to various factors such as RA capacity, performance metrics, EMV detection feedback, and so on.

In some embodiments, a third EMV prediction threshold may be implemented to deactivate EMV responses. If the EMV prediction signal 304 (e.g., EMV detection confidence) falls below this third EMV prediction threshold, all EMV responses may be deactivated in the AV if the RA has not been connected. If the RA has been connected (e.g., establishing a communication connection with a remote server providing an RA session) before the EMV prediction signal 304 drops below the third EMV prediction threshold, the EMV responses may be kept and the deactivation decision can be deferred to the RA.

In one embodiment, as discussed above, the planning advisor 320 may determine that assistance from the RA 310 should be requested for the EMV prediction signal 304. Once sent to the RA 310, the EMV RA request 312 may cause the autonomous vehicle to enter into a first RA session with the RA 310 where an interface is established between the autonomous vehicle and the RA 310. The interface allows the RA 310 to review the EMV prediction signal 304 and allows the RA 310 to provide directives to the autonomous vehicle with respect to the EMV prediction signal 304. Based on review of the EMV prediction signal 304, including review of a current scene context of the autonomous vehicle, the RA 310 can confirm or deny the presence of an active EMV in the vicinity of the autonomous vehicle via the EMV RA response 314. If the RA 310 denies the presence of an active EMV, then the planning advisor can issue the false positive suppression signal 322 to the management system 330, which causes the management system 330 to ignore the EMV prediction signal 304 from EMV observer 302.

On the other hand, if the RA 310 confirms the presence of an active EMV, then the RA 310 can enter into a second RA session with the autonomous vehicle and issue maneuver override 316 directives to the autonomous vehicle. In one embodiment, the maneuver override 316 directives may include directives to override existing autonomous vehicle maneuvers that the management system 330 may have autonomously put in place for the autonomous vehicle. In one example, the maneuver override 316 may include a directive to (1) make the autonomous vehicle stop, (2) make the autonomous vehicle pull over to the left, (3) make the autonomous vehicle pull over to the right, or (4) indicate an all clear situation such that the autonomous vehicle resumes driving without further consideration for the EMV object. In some embodiments, the directive does not directly control the autonomous vehicle. Instead, the directive can indicate the maneuver override 316, but the autonomous vehicle figures out how the course of action of the maneuver override should be implemented.

Other maneuver override 316 directives may be provided by RA 310 in embodiments herein, and the maneuver override 316 directives are not limited to the directives noted above. For example, in some implementations, the RA 310 may provide waypoints for the autonomous vehicle to follow or override a particular stopping directive of the autonomous vehicle.

In embodiments herein, the management system 330 may receive signals from the detection system 216, the planning advisor 320, and/or the RA 310 with respect to a detected active EMV in a vicinity of the autonomous vehicle. Based on the received signals, the management system 330 may then determine how to respond to the active EMV and encode a representation of that response to provide to lower-level planning systems of the autonomous vehicle, such as the planning solver 340 and motion planner 350.

In one embodiment, if the management system 330 receives a false positive suppression signal 322, the management system 330 can ignore the EMV prediction signal 304 received from the detection system 216. In one embodiment, if the management system 330 receives maneuver override 316 directives from the RA 310, the management system 330 generates a response in line with the received maneuver override 316 directives.

In one embodiment, if the management system 330 receives an autonomous handling signal 324 from the planning advisor 320, the management system 330 may then autonomously determine a response of the autonomous vehicle to the detected active EMV. The management system 330 may utilize the EMV prediction signal 304, as well as the additional information regarding contextual elements of the detected object corresponding to the EMV prediction signal 304, in order to formulate a response to the detected active EMV.

In embodiments herein, the management system 330 can encode a representation of the response to provide to the planning solver 340. For example, the representation of the response may be in a Robot Operating System (ROS) message format. The representation of the response provides an intent of the response of the autonomous vehicle within an interface that is suitable for the lower-level planner systems to generate and evaluate candidate solutions (e.g., trajectories) to effectuate the actual autonomous vehicle response. As such, the representation is an expression of autonomous vehicle response intent, rather than a specific trajectory or directives for the autonomous vehicle to follow.

In one embodiment, the representation may be referred to as an EMV scenario 332. The EMV scenario 332 may include requirements (e.g., parameters) of behaviors of the autonomous vehicle in responding to the detected active EMV. The requirements (parameters) may include, for example, an identifier, a priority, one or more goals, an urgency, and/or behavioral flag(s). The priority may indicate an overriding priority to utilize for ranking the EMV scenario against other scenarios received by the lower-level planning systems. The goals may outline constraints on the end state of the scenario such as, for example, whether the autonomous vehicle should stop, inclusion and exclusion regions for the end state, whether to use hazards, and/or behavior after coming to a stop (e.g., shift to park, apply emergency brake, etc.). The urgency may indicate how urgent the goal is and can influence details (e.g., how much braking to incur, how hard to brake, etc.) of how the lower-level planning systems cost and solve for trajectories to enable the EMV scenario. The behavioral flags may include keep clear, tight waypoint following, reverse allowed, conservative rear time to clear (e.g., rear end risk), creeping, and so on.

In one embodiment, the management system 330 may include an EMV library 335 to reference in order to determine which requirements (parameters) and flags should be encoded in the EMV scenario in response to an active detected EMV. For example, the EMV library 335 may indicate what priority values, urgency values, goal parameters, and/or behavioral flags to set (based on the contextual elements of the detected EMV object) in order to indicate a particular active EMV response intent in the EMV scenario 332 generated by the management system 330.

In some embodiments, the EMV library 335 may map the contextual information of a detected active EMV to the parameters that are set in the EMV scenario 332. For example, the EMV library 335 may dictate that if the context information indicates the active EMV object is not visible, but has siren audio indicating that the EMV is travelling towards the autonomous vehicle, then the EMV scenario should set parameters to have the autonomous vehicle come to a stop as soon as possible and before entering an intersection, crossing the next minor road, or crossing the next emergency driveway. In another example, the EMV library 335 may dictate that if the context information indicates the active EMV object is not visible, but has siren audio indicating that the EMV is travelling away from the autonomous vehicle, then the EMV scenario should set parameters to have the autonomous vehicle proceed normally. In a further example, the EMV library 335 may dictate that if the context information indicates the active EMV object is visible, is coming towards the autonomous vehicle, and the EMV is on a non-divided road or the same side of a divider as the autonomous vehicle, then the EMV scenario should set parameters to have the autonomous vehicle drive to the edge of the road and come to a stop before entering the next intersection or crossing the next minor road. The examples above provide a small subset of options and implementations for EMV scenarios 332 and are not limited to solely the examples above.

Parameters for multiple various EMV scenarios 332 that can be generated based on the detected active EMV object and the contextual information of the detected active EMV object can be maintained in the EMV library 335. Furthermore, the EMV library 335 may indicate other options for potential EMV scenarios 332, such as options for lateral road clearance to maintain in a EMV scenario 332, fallback behaviors that are allowed, options for single lane roads versus multi-lane roads, options for one-way roads, options for biasing within a lane or out of a lane, options for autonomous vehicle hazards and turn signal light usage, options for parking brake usage, and so on.

Once generated, the EMV scenario 332 can be passed to the planning solver 340. In one embodiment, the planning solver 340 may be a non-convex solver (NCS) capable of receiving an EMV scenario 332 and computing a corresponding trajectory 342 to satisfy the EMV scenario 332. Other types of planning solvers 340 may also be utilized in embodiments herein. In one embodiment, the planning solver 340 may utilize the parameters provided in the EMV scenario 332 (e.g., priority, goals, urgency, behavioral flags, etc.) to generate multiple different possible trajectory solutions that can satisfy the EMV scenario 332 and may generate a cost for each of the possible trajectory solutions. The planning solver 340 may then utilize a cost function optimization approach to select one of the possible trajectory solutions to output as an optimum or acceptable trajectory 342 for the autonomous vehicle.

In one embodiment, the planning solver 340 passes the trajectory 342 to the motion planner 350. The motion planner 350 may determine a series of waypoint, velocities, and/or accelerations, for example, that the autonomous vehicle should take for the provided trajectory 342. The motion planner 350 can provide autonomous vehicle actuation 352 directives to the control system 220 to cause the mechanical systems of autonomous vehicle to effectuate appropriate motion of the autonomous vehicle in order to respond to the detected active EMV as indicated by the generated EMV scenario.

Figure 4:
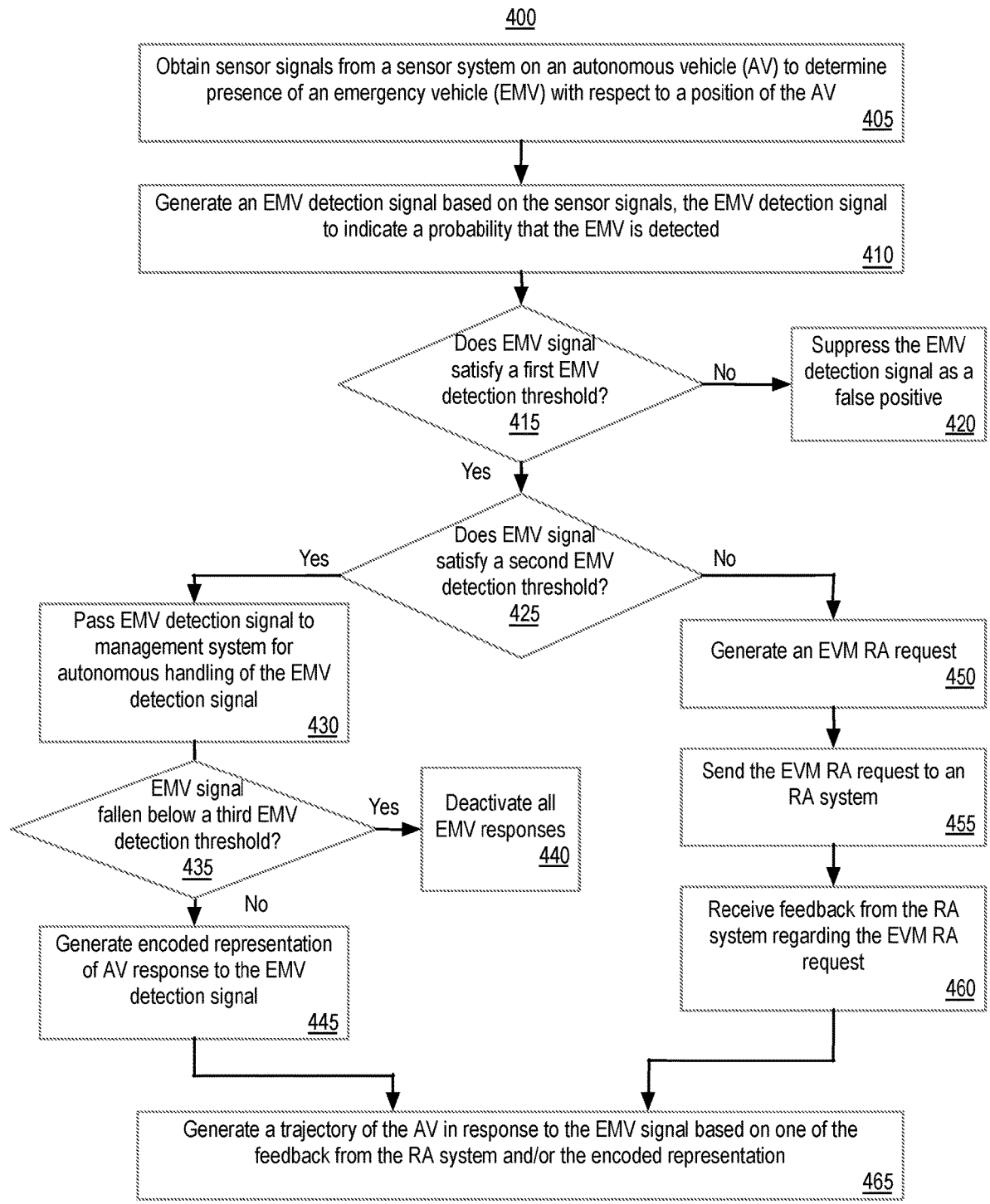
FIG. 4 illustrates an example method for identifying a response mode of a planning system in response to a detected EMV signal.

FIG. 4 illustrates an example method 400 for identifying a response mode of a planning system in response to a detected EMV signal. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method 400 includes block 405 where sensor signals are obtained from a sensor system on an AV to determine presence of an EMV with respect to a position of the AV. In one embodiment, a detection system of the AV obtains the sensor signals. The detection system may include an EMV observer that obtains (e.g., monitors) the sensor signals. In one embodiment, the sensor signals include audio signal and video signals.

At block 410, an EMV detection signal is generated based on the sensor signals. In one embodiment, the EMV detection signal can indicate a probability that the EMV is detected. For example, a trained machine learning model of the EMV observer may output a probability value that a particular object associated with the sensor signals is an active EMV.

At decision block 415, it is determined whether the EMV signal satisfies a first EMV detection threshold. In one embodiment, the first EMV detection threshold may be a percentage value, and the first EMV detection threshold may be satisfied when the EMV signal is a percentage value that equals or exceeds the first EMV detection threshold. In one embodiment, a planning advisor of a planning system of the autonomous vehicle makes the determination. If the EMV signal does not satisfy the first EMV threshold, then method 400 proceeds to block 420 where the planning system suppresses (i.e., ignores) the EMV detection signal as a false positive. On the other hand, if the EMV signal does satisfy the first EMV detection threshold, then method 400 proceeds to decision block 425, where it is determined whether the EMV signal satisfies a second EMV detection threshold. In one embodiment, the second EMV detection threshold may be a percentage value, and the second EMV detection threshold may be satisfied when the EMV signal is a percentage value that equals or exceeds the second EMV detection threshold. In one embodiment, the planning advisor performs the determination of decision block 425.

If the EMV signal does satisfy the second EMV detection threshold, the method 400 proceeds to block 430 where the EMV detection signal is passed to a management system (of the planning system) for autonomous handling of the EMV detection signal.

At decision block 435, it is determined whether the EMV signal has fallen below a third EMV detection threshold. If so, the method 400 proceeds to block 440 where all EMV responses in the AV are deactivated. On the other hand, if the EMV signal remains about the third threshold, then method 400 proceeds to block 445. At block 445, the management system generates an encoded representation of a response of the AV to the EMV detection signal. In one embodiment, the encoded representation is a representation of an intent of the autonomous vehicle to respond to the detected EMV. The encoded representation may be referred to as a EMV scenario and may be encoded in an ROS message format. In one embodiment, the encoded representation includes an identifier, a priority, one or more goals, an urgency, and/or behavioral flags that represent parameters of an intended response of the autonomous vehicle.

Following operation 445, the method 400 then proceeds to block 465 where a trajectory of the AV is generated in response to the EMV signal. In one embodiment, the trajectory is generated based on the encoded representation. For example, the planning system (e.g., a planning solver, such as an NCS) may utilize the parameters provided in the EMV scenario to generate multiple different possible trajectory solutions that can satisfy the EMV scenario and generate a cost for each of the possible trajectory solutions. The planning system may then utilize a cost function optimization approach to select one of the possible trajectory solutions to output as the optimum or acceptable trajectory for the AV.

Referring back to decision block 425, if it is determined that the EMV signal does not satisfy the second EMV detection threshold, then method 400 instead proceeds to block 450 where an EMV RA request is generated. The EMV RA request is sent to the RA at block 455. In one embodiment, the EMV RA request enables an RA session to be entered between the RA and the AV in order to allow the RA to review the EMV detection signal and allow the RA to provide directives to the AV with respect to the EMV detection signal. At block 460, feedback from the RA system is received regarding the EMV RA request. The feedback may include a confirmation or denial of the detected EMV, and/or maneuver override directives for the AV to follow in response to a confirmed detected active EMV. Method 400 then proceeds to block 465, where a trajectory of the AV is generated in response to the EMV signal. In this case, the trajectory is based on the feedback from the RA system.

FIG. 5 illustrates an example method 500 for generating an encoded representation for a response to an active EMV by an AV. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method 500 includes block 510 where an indication is received to autonomously handle an active EMV detected by AV. In one embodiment, a management system of a planning system of the AV may receive the indication from a planning advisor of the planning system. Then, at block 520, requirements (parameters) of behaviors of the AV are identified in responding to the detected EMV. In one embodiment, the requirements of the behavior can include a stopping region, inclusion regions, exclusion regions, urgency, and behavioral flags, for example.

Subsequently, at block 530, the identified requirements are encoded in a representation of a response of the AV to the EMV. In one embodiment, the representation is encoded in a ROS message format. The encoded representation may be referred to as an EMV scenario in some embodiments herein. Lastly, at block 540, the encoded representation is passed to a trajectory generation system to generate a trajectory of the AV in view of the representation. In one embodiment, the trajectory is generated based on the encoded representation. For example, the planning system may utilize the parameters provided in the EMV scenario to generate multiple different possible trajectory solutions that can satisfy the EMV scenario and generate a cost for each of the possible trajectory solutions. The planning system (e.g., a planning solver, such as an NCS) may then utilize a cost function optimization approach to select one of the possible trajectory solutions to output as the optimum or acceptable trajectory for the AV.

FIG. 6 illustrates an example method 600 for autonomous handling of a response to a detected EMV signal by an AV. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some embodiments, the method 600 includes block 610 where an EMV detection signal is received based on sensor signals of the AV. In one embodiment, the EMV detection signal is a probability value output by a trained machine learning model. The probability value can indicate a probability that a detected object associated with one or more sensor signals (e.g., audio signal, video signal, etc.) is an active EMV. Then, at block 620, it is determined, based on the EMV detection signal, whether RA is invoked for the EMV signal or whether the AV is to handle the EMV detection signal autonomously. In one embodiment, a planning advisor of a planning system may perform the determination of whether to invoke the RA or to handle autonomously based on a set of EMV detection threshold values. The planning advisor may apply a set of EMV detection threshold values to the EMV detection signal to determine whether to invoke the RA or to handle autonomously.

Subsequently, at block 630, responsive to determining that the AV is to handle the EMV detection signal autonomously, an encoded representation of a response of the AV to the EMV detection signal is generated. In one embodiment, the encoded representation is generated by a management system of the autonomous vehicle based on an EMV library. In one embodiment, the encoded representation is generated in accordance with method 500 of FIG. 5.

Lastly, at block 640, based on the encoded representation of the response, a trajectory of the AV is determined in response to the EMV detection signal. In one embodiment, a planning system may utilize the parameters provided in the encoded representation to generate multiple different possible trajectory solutions that can satisfy the encoded representation and generate a cost for each of the possible trajectory solutions. The planning system (e.g., a planning solver, such as an NCS) may then utilize a cost function optimization approach to select one of the possible trajectory solutions to output as the optimum or acceptable trajectory for the AV.

FIG. 7 illustrates an example method 700 for RA handling of a response to a detected EMV signal for an AV. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

According to some embodiments, the method 700 includes block 710 where an EMV detection signal is received. In one embodiment, the EMV detection signal is generated based on sensor signals (e.g., audio signals, video signals, etc.) of an AV. Then, at block 720, based on the EMV detection signal, it is determined whether RA is invoked for the EMV signal or whether the AV is to handle the EMV detection signal autonomously. In one embodiment, a planning advisor of a planning system may perform the determination of whether to invoke the RA or to handle autonomously based on a set of EMV detection threshold values. The planning advisor may apply a set of EMV detection threshold values to the EMV detection signal to determine whether to invoke the RA or to handle autonomously.

Subsequently, at block 730, responsive to determining that the RA is invoked for the EMV signal, an EMV RA request is sent to the RA. In one embodiment, the planning advisor generates and sends the EMV RA request. In one embodiment, the EMV RA request enables an RA session to be entered between the RA and the AV in order to allow the RA to review the EMV detection signal and allow the RA to provide directives to the AV with respect to the EMV detection signal. At block 740, in response to the EMV RA request, feedback from the RA is received. In one embodiment, the feedback provides guidance with respect to the EMV detection signal. The guidance may include confirmation or denial of the EMV detection signal, and/or maneuver overrides for the AV to apply.

Lastly, at block 750, based on the feedback from the RA, a trajectory of the AV is determined in response to the EMV signal. In one embodiment, a planning system may utilize the parameters provided in the encoded representation to generate multiple different possible trajectory solutions that can satisfy the encoded representation and generate a cost for each of the possible trajectory solutions. The planning system (e.g., a planning solver, such as an NCS) may then utilize a cost function optimization approach to select one of the possible trajectory solutions to output as the optimum or acceptable trajectory for the AV.

Figure 8:
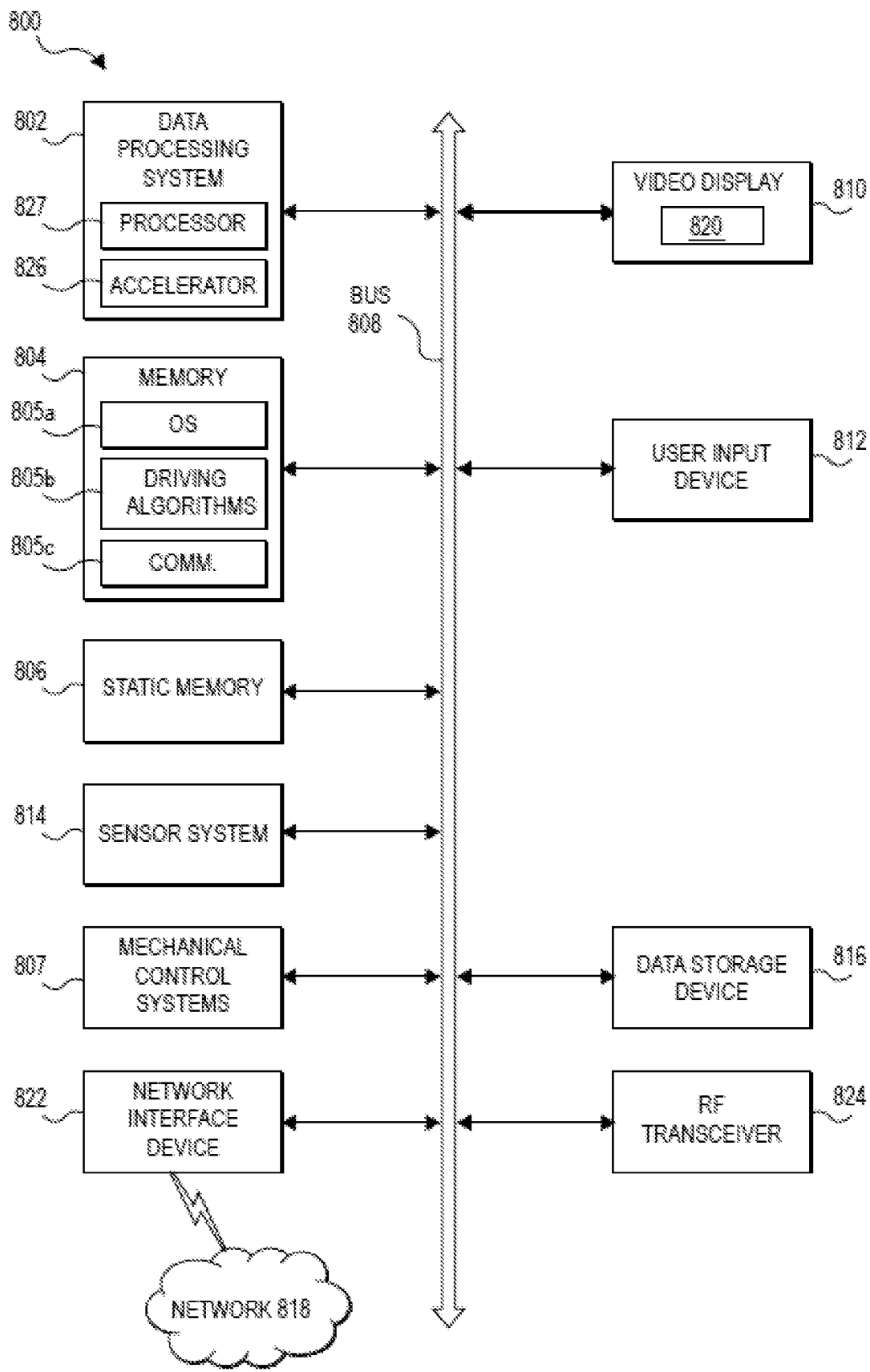
FIG. 8 illustrates a diagram of a vehicle having driver assistance according to embodiments herein.

FIG. 8 is a block diagram of a vehicle 800 having driver assistance according to embodiments herein. Within the data processing system 802 (or computer system 802) is a set of instructions for causing the machine to perform any one or more of the methodologies discussed herein including machine learning operations for object detection and part segmentation. In alternative embodiments, the machine may be connected (e.g., networked) to other machines in a LAN, an intranet, an extranet, or the Internet. The machine can operate in the capacity of a server or a client in a client-server network environment, or as a peer machine in a peer-to-peer (or distributed) network environment, the machine can also operate in the capacity of a web appliance, a server, a network router, switch or bridge, event producer, distributed node, centralized system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The data processing system 802, as disclosed above, includes processing logic in the form of a general purpose instruction-based processor 827 or an accelerator 826 (e.g., graphics processing units (GPUs), FPGA, ASIC, etc.)). The general purpose instruction-based processor may be one or more general purpose instruction-based processors or processing devices (e.g., microprocessor, central processing unit, or the like). More particularly, data processing system 802 may be a complex instruction set computing (CISC) microprocessor, reduced instruction set computing (RISC) microprocessor, very long instruction word (VLIW) microprocessor, general purpose instruction-based processor implementing other instruction sets, or general purpose instruction-based processors implementing a combination of instruction sets. The accelerator may be one or more special-purpose processing devices such as an application specific integrated circuit (ASIC), a field programmable gate array (FPGA), a digital signal general purpose instruction-based processor (DSP), network general purpose instruction-based processor, many light-weight cores (MLWC) or the like.

Data processing system 802 is configured to perform the operations and methods discussed herein. The example vehicle 800 includes a data processing system 802, main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a data storage device 816 (e.g., a secondary memory unit in the form of a drive unit, which may include fixed or removable computer-readable storage medium), which communicate with each other via a bus 808. The storage units disclosed herein may be configured to implement the data storing mechanisms for performing the operations and methods discussed herein. Static memory 806 can store code and/or data for use by processor 827 or accelerator 826. Static memory 806 includes a memory hierarchy that can be implemented using any combination of RAM (e.g., SRAM, DRAM, DDRAM), ROM, FLASH, magnetic and/or optical storage devices. Memory may also include a transmission medium for carrying information-bearing signals indicative of computer instructions or data (with or without a carrier wave upon which the signals are modulated).

Processor 827 and accelerator 826 execute various software components stored in memory 804 to perform various functions for data processing system 802. Furthermore, memory 804 may store additional modules and data structures not described above.

Operating system 805a includes various procedures, sets of instructions, software components and/or drivers for controlling and managing general system tasks and facilitates communication between various hardware and software components. Driving algorithms 805b (e.g., method, object detection, driver assistance, etc.) utilize sensor data from the sensor system 814 to provide object detection (such as EMV detection for responding to EMVs), segmentation, driver assistance features, and tire road friction limit nearness estimation for different applications such as driving operations of vehicles. A communication module 805c provides communication with other devices utilizing the network interface device 822 or RF transceiver 824.

The vehicle 800 may further include a network interface device 822. In an alternative embodiment, the data processing system disclosed is integrated into the network interface device 822 as disclosed herein. The vehicle 800 also may include a video display unit 810 (e.g., a liquid crystal display (LCD), LED, or a cathode ray tube (CRT)) connected to the computer system through a graphics port and graphics chipset, a user input device 812 (e.g., a keyboard, a mouse), and a Graphic User Interface (GUI) 820 (e.g., a touch-screen with input & output functionality) that is provided by the display 810.

The vehicle 800 may further include a RF transceiver 824 that provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/de-interleaving, spreading/dispreading, inverse fast Fourier transforming (IFFT)/fast Fourier transforming (FFT), cyclic prefix appending/removal, and other signal processing functions.

The data storage device 816 may include a machine-readable storage medium (or more specifically a computer-readable storage medium) on which is stored one or more sets of instructions embodying any one or more of the methodologies or functions described herein. Disclosed data storing mechanism may be implemented, completely or at least partially, within the main memory 804 and/or within the data processing system 802, the main memory 804 and the data processing system 802 also constituting machine-readable storage media.

In one example, the vehicle 800 with driver assistance is an autonomous vehicle that may be connected (e.g., networked) to other machines or other autonomous vehicles using a network 818 (e.g., LAN, WAN, cellular network, or any network). The vehicle can be a distributed system that includes many computers networked within the vehicle. The vehicle can transmit communications (e.g., across the Internet, any wireless communication) to indicate current conditions (e.g., an alarm collision condition indicates close proximity to another vehicle or object, a collision condition indicates that a collision has occurred with another vehicle or object, etc.). The vehicle can operate in the capacity of a server or a client in a client-server network environment, or as a peer machine in a peer-to-peer (or distributed) network environment. The storage units disclosed in vehicle 800 may be configured to implement data storing mechanisms for performing the operations of autonomous vehicles.

The vehicle 800 also includes sensor system 814 and mechanical control systems 807 (e.g., chassis control, vehicle propulsion system, driving wheel control, brake control, etc.). The data processing system 802 executes software instructions to perform different features and functionality (e.g., driving decisions) and provide a graphical user interface 820 for an occupant of the vehicle. The data processing system 802 performs the different features and functionality for autonomous operation of the vehicle based at least partially on receiving input from the sensor system 814 that includes lidar sensors, cameras, radar, GPS, and additional sensors. The data processing system 802 may be an electronic control unit for the vehicle.

The above description of illustrated implementations of the embodiments herein, including what is described in the Abstract, is not intended to be exhaustive or to limit the embodiments herein to the precise forms disclosed. While specific implementations of, and examples for, the embodiments are described herein for illustrative purposes, various equivalent modifications are possible within the scope of the embodiments herein, as those skilled in the relevant art will recognize.

These modifications may be made to the embodiments herein in light of the above detailed description. The terms used in the following claims should not be construed to limit the embodiments to the specific implementations disclosed in the specification and the claims. Rather, the scope of the embodiments is to be determined entirely by the following claims, which are to be construed in accordance with established doctrines of claim interpretation.

The invention claimed is:

1. A method comprising: generating an emergency vehicle (EMV) detection signal based on sensor signals of an autonomous vehicle (AV), the generating including identifying one of an active state and an inactive state of the EMV; determining, based on the EMV detection signal, whether remote assistance (RA) is invoked for the EMV signal or whether the AV is to handle the EMV detection signal autonomously; generating an encoded representation of a response of the AV to the EMV detection signal, including (1) identifying requirements of behaviors of the AV in responding to the EMV including a priority of an EMV response used by a planning layer against other possible responses for the AV in response to the EMV detection signal and (2) encoding the identified requirements in a representation of a response of the AV to the EMV, wherein the encoded representation further includes a set goals, including a stopping region, an inclusion regions, an exclusion regions, an indication as to whether to use hazard lights on the AV, an urgency of the set of goals, and behavioral flags, including flags that indicate when the AV is to keep clear, a tight waypoint is upcoming, reverse is allowed for the AV, and creeping is allowed for the AV; responsive to determining that the AV is to handle the EMV detection signal autonomously, determining a trajectory of the AV in response to the EMV detection signal based on the encoded representation; controlling mechanical systems of the AV using a control system to execute the determined trajectory, wherein the mechanical systems include at least a vehicle propulsion system, a braking system and a steering system.

2. The method of claim 1, further comprising:
responsive to determining that the RA is invoked for the EMV signal, sending an EMV RA request to the RA;
receiving, in response to the EMV RA request, feedback from the RA providing guidance with respect to the EMV detection signal; and
determining, based on the feedback from the RA, a trajectory of the AV in response to the EMV signal.

3. The method of claim 1, wherein the encoded representation is encoded in Robot Operating System (ROS) message format.

4. The method of claim 1, wherein the feedback from the RA comprises at least one of an indication that an EMV is not detected in a vicinity of the AV or a maneuver override to apply to the encoded representation of the response.

5. The method of claim 1, wherein the EMV detection signal comprises a probability value that an EMV is detected in a vicinity of the AV and which lane, relative to the AV, that the EMV is located, and wherein the EMV detection signal is generated from a machine-learning (ML) model trained to identify EMVs from the sensor signals of the AV.

6. The method of claim 5, wherein responsive to the EMV detection signal satisfying a first threshold for the EMV detection signal but not satisfying a second threshold for the EMV detection signal, a determination to invoke the RA for the EMV detection signal is made, wherein the first and second thresholds are tuned according to EMV detection feedback.

7. The method of claim 5, wherein responsive to the EMV detection signal satisfying a first threshold for the EMV detection signal and satisfying a second threshold for the EMV detection signal, a determination for the AV to handle the EMV detection signal autonomously is made.

8. An apparatus comprising:
at least one memory; and
at least one processor coupled to the at least one memory, wherein the at least one processor is to:
generate an emergency vehicle (EMV) detection signal based on sensor signals of an autonomous vehicle (AV), the generating including identifying one of an active state and an inactive state of the EMV;
determine, based on the EMV detection signal, whether remote assistance (RA) is invoked for the EMV signal or whether the AV is to handle the EMV detection signal autonomously;
generate an encoded representation of a response of the AV to the EMV detection signal, including (1) identifying requirements of behaviors of the AV in responding to the EMV including a priority of an EMV response used by a planning layer against other possible responses for the AV in response to the EMV detection signal and (2) encoding the identified requirements in a representation of a response of the AV to the EMV, wherein the encoded representation further includes a set goals, including a stopping region, an inclusion regions, an exclusion regions, an indication as to whether to use hazard lights on the AV, an urgency of the set of goals, and behavioral flags, including flags that indicate when the AV is to keep clear, a tight waypoint is upcoming, reverse is allowed for the AV, and creeping is allowed for the AV;
responsive to determining that the AV is to handle the EMV detection signal autonomously, determine a trajectory of the AV in response to the EMV detection signal based on the encoded representation; and
responsive to determining the trajectory, control mechanical systems of the AV using a control system to execute the determined trajectory, wherein the mechanical systems include at least a vehicle propulsion system, a braking system and a steering system.

9. The apparatus of claim 8, wherein the at least one processor is further to:
responsive to determining that the RA is invoked for the EMV signal, send an EMV RA request to the RA;
receive, in response to the EMV RA request, feedback from the RA providing guidance with respect to the EMV detection signal; and
determine, based on the feedback from the RA, a trajectory of the AV in response to the EMV signal.

10. The apparatus of claim 9, wherein the feedback from the RA comprises at least one of an indication that an EMV is not detected in a vicinity of the AV or a maneuver override to apply to the encoded representation of the response.

11. The apparatus of claim 8, wherein the EMV detection signal comprises (1) a probability value that an EMV is detected in a vicinity of the AV, (2) whether a detected EMV is currently visible and audible to the AV, (3) position and movement of a detected EMV to the EMV, (4) whether a detected EMV is moving towards or away from the AV, (5) whether a detected EMV is approaching the AV from the front, the rear, the left, or the right, (6) whether a detected EMV is in a same lane or a lane left or right of the AV, (7) whether a detected EMV and the AV are currently driving on opposite sides of a divided road from each other, and (8) how much lateral road clearance is possible to provide on the current road when stopping the AV, and wherein the EMV detection signal is generated from a machine-learning (ML) model trained to identify EMVs from the sensor signals of the AV.

12. The apparatus of claim 11, wherein responsive to the EMV detection signal satisfying a first threshold for the EMV detection signal but not satisfying a second threshold for the EMV detection signal, a determination to invoke the RA for the EMV detection signal is made, wherein the first and second thresholds are tuned according to EMV detection feedback.

13. The apparatus of claim 11, wherein following invoking the RA but before the RA has connected, responsive to the EMV detection signal falling below a third threshold, all EMV responses are deactivated.

14. A non-transitory computer-readable medium having stored thereon instructions that, when executed by one or more processors, cause the one or more processors to: generate an emergency vehicle (EMV) detection signal based on sensor signals of an autonomous vehicle (AV), the generating including identifying one of an active state and an inactive state of the EMV; determine, based on the EMV detection signal, whether remote assistance (RA) is invoked for the EMV signal or whether the AV is to handle the EMV detection signal autonomously; generating an encoded representation of a response of the AV to the EMV detection signal, including (1) identifying requirements of behaviors of the AV in responding to the EMV including a priority of an EMV response used by a planning layer against other possible responses for the AV in response to the EMV detection signal and (2) encoding the identified requirements in a representation of a response of the AV to the EMV, wherein the encoded representation further includes a set goals, including a stopping region, an inclusion regions, an exclusion regions, an indication as to whether to use hazard lights on the AV, an urgency of the set of goals, and behavioral flags, including flags that indicate when the AV is to keep clear, a tight waypoint is upcoming, reverse is allowed for the AV, and creeping is allowed for the AV; and responsive to determining that the AV is to handle the EMV detection signal autonomously, determine a trajectory of the AV in response to the EMV detection signal based on the encoded representation; and responsive to determining the trajectory, controlling mechanical systems of the AV using a control system to execute the determined trajectory, wherein the mechanical systems include at least a vehicle propulsion system, a braking system and a steering system.

15. The non-transitory computer-readable medium of claim 14, wherein the
instructions, when executed by the one or more processors, cause the one or more processors to:
responsive to determining that the RA is invoked for the EMV signal, send an EMV RA request to the RA;
receive, in response to the EMV RA request, feedback from the RA providing guidance with respect to the EMV detection signal; and
determine, based on the feedback from the RA, a trajectory of the AV in response to the EMV signal.

16. The non-transitory computer-readable medium of claim 14, wherein the EMV detection signal comprises a probability value that an EMV is detected in a vicinity of the AV, and wherein the EMV detection signal is generated from a machine-learning (ML) model trained to identify EMV s from the sensor signals of the AV.

17. The non-transitory computer-readable medium of claim 16, wherein responsive to the EMV detection signal satisfying a first threshold for the EMV detection signal but not satisfying a second threshold for the EMV detection signal, a determination to invoke the RA for the EMV detection signal is made, and wherein responsive to the EMV detection signal satisfying a first threshold for the EMV detection signal and satisfying a second threshold for the EMV detection signal, a determination for the AV to handle the EMV detection signal autonomously is made.

\* \* \* \* \*